Patented Oct. 31, 1944

2,361,467

UNITED STATES PATENT OFFICE 2,361,467

LUMINESCENT MATERIAL

Harry M. Fernberger, Cleveland Heights, Ohio, assignor to General Electric Company, a corporation of New York No Drawing. Application August 11, 1942, Serial No. 454,471

3 Claims. (Cl. 252—301.5)

This invention relates to a combination of an electric discharge device producing radiation and luminescent material or phosphor that is exposed to this radiation to be excited to luminescence. The invention affords a novel type of phosphor that is most advantageously and powerfully excited by ultraviolet radiation of about 3000 A. to 3800 A., and especially 3650 A., to which ordinary glass is transparent, though also excitable by other means, such as the 2537 A. resonance radiation of mercury. For 3650 A. excitation, a layer of my phosphor may be coated on the inner surface of an enclosing jacket of a high-pressure mercury vapor lamp, as illustrated in McKeag et al. Patent 2,103,085, for example; or the phosphor layer may be employed to provide color in a design, a sign, a dial, or the like, that is exposed to the radiation from such a lamp. The quality of fluorescent light from my phosphor makes the phosphor very suitable for markings or indicia that must be clearly seen at night, whether in total darkness, or in the presence of the limited light from a clear night sky.

Phosphors consist in general of a major proportion of a so-called base material or matrix and a minor proportion of another material called an activator. The luminescent qualities of the phosphor generally depend on the relations between matrix and activator materials, as determined by heat-treatment which they undergo together, as well as on the identity of these materials themselves. For the convenience of those desiring to use my invention, I will describe preferred species of phosphor advantageously embodying the invention, and their manufacture. Various features and advantages of the invention will become apparent from this description.

Using cadmium tungstate as the base material or matrix of my phosphor, and bismuth and samarium as activators, cadmium tungstate of desired high purity may be prepared in any ordinary way, as for instance by one of the following reactions:

(1) $CdO + WO_3 \rightarrow CdWO_4$
(2) $Cd(NO_3)_2 + H_2WO_4 + NH_4OH \rightarrow CdWO_4 +$
(3) $Cd(NO_3)_2 + Na_2WO_4 \rightarrow CdWO_4 +$
(4) $Cd(NO_3)_2 + (NH_4)_6W_7O_{24} \cdot 6H_2O \rightarrow CdWO_4 +$ A "flux" may advantageously be used, such as aluminum fluoride, for example. The incorporation of activator material into the matrix may be combined with the preparation of cadmium tungstate by adding suitable bismuth and samarium compounds to the batch of reactants for forming this tungstate. For this purpose, bismuth nitrate or oxide and samarium nitrate or fluoride are suitable. All the components of the batch may be mixed together in a fine state of division; or an aqueous solution of the activating compounds (e. g., nitrates) may be made, and the mixture of the other components may be wet down with this to a stiff paste or slurry, which may be dried in a steam oven and powdered again. For example, the mixture to which the solution of activating compounds is added may consist of:

|  | Grams |
|---|---|
| Cadmium oxide (CdO) | 128 |
| Tungstic acid ($H_2WO_4$) | 250 |
| Aluminum fluoride ($AlF_3$) | 4 |

After drying and powdering, the batch may be heated (exposed to the air) to a temperature of some 800° C. to 1000° C., more or less, for a period depending on the temperature and on the particular reaction(s) involved: e. g., a temperature of 800° C. may be maintained for a period of ½ to 1 hour, while a temperature of 1000° C. need generally be maintained for only 10 to 15 minutes. However, in the use of ammonium paratungstate according to Equation 4 above, heating at 1000° C. for ½ hour to 1 hour is desirable. The heating may be done in a refractory crucible (as of porcelain, silica, or alundum) in a refractory electric muffle furnace. After cooling, the phosphor may be repowdered, and may be used in any suitable or preferred manner, as indicated above. The quality of the fluorescent light from the phosphor depends principally on the activating elements used, as explained more fully hereinafter.

Without radically altering the character of the fluorescent light from the phosphor, beryllium may be included in its base material or matrix, and in some cases seems to render the fluorescent light whiter and brighter. It has an effect similar to that of the aluminum fluoride flux in rendering the phosphor powder substantially white, when looked at by ordinary daylight, instead of greenish, yellowish, or brownish, as it generally appears if a practical excess of either tungstic acid or cadmium compound is used in the batch that is fired to produce the phosphor. When such a matrix of cadmium-beryllium tungstate is desired, the formula for the mixture to which the solution of activating compounds is added may be as follows:

|  | Grams |
|---|---|
| Cadmium oxide (CdO) | 128 |
| Beryllium oxide (BeO) | 15 |
| Tungstic acid ($H_2WO_4$) | 250 |

Unlike the aluminum fluoride, the beryllium oxide does not appear to volatilize out of the batch to any material extent during the firing. Whether it reacts with the tungstic acid or forms a solid solution with some of the cadmium oxide I do not wish to say; possibly both actions take place.

The amounts of activating compounds used are to be calculated on the basis of their bismuth and samarium contents, all amounts and proportions hereinafter stated being by weight. A fair working range is for bismuth $\frac{1}{10}$ to $\frac{1}{2}$ of 1 per cent, and for samarium $\frac{1}{2}$ to $1\frac{1}{2}$ per cent. Quantities below these ranges produce inferior fluorescent brightness, while quantities above these ranges produce no commensurate advantage, and may even give inferior brightness. This last is especially true as regards samarium, which in excessive proportions reduces the total luminous intensity to such a degree as to render the phosphor unserviceable for many purposes. Bismuth used alone as an activator for cadmium tungstate greatly increases its response to 3650 Å. excitation without much changing the quality of the resulting visible fluorescent light, which is a yellowish green. Samarium alone gives a faint red light. The coaction of these two activators results in visible fluorescent light of a desirable reddish-yellow quality and of serviceable intensity. In general, the samarium and bismuth should vary together, and the quantity of samarium should preferably be at least about twice as much as the quantity of bismuth, and may be considerably more than twice as much. Such a major proportion of samarium along with a minor proportion of bismuth sensibly reddens the fluorescent light of the phosphor, under 3650 Å. excitation, without major reduction in the intensity of the light. For some purposes, bismuth alone may be used as an activator in cadmium tungstate phosphor containing beryllium, since such phosphor fluoresces brightly with rather a whitish yellow light, although the light does tend to show a greenish tinge that is objectionable for other purposes.

To give specific illustrations, I may mention that 0.2 per cent bismuth and 0.5 per cent samarium produce a good cadmium tungstate phosphor, brighter and of better reddish yellow color than one with only 0.1 per cent bismuth and 0.25 per cent samarium, while 0.2 per cent bismuth and 1 per cent samarium give inferior brightness, though a more decidedly orange quality of light. For a cadmium tungstate phosphor activated with bismuth alone, proportions of bismuth between 0.1 per cent and 0.2 per cent may advantageously be used.

What I claim as new and desire to secure by Letters Patent of the United States is:

1. A phosphor comprising cadmium tungstate as matrix material, activated with bismuth and samarium as cooperating activators, and characterized by fluorescence of reddish yellow quality and of serviceable intensity under excitation by 3650 Å. radiation, as contrasted with the yellowish green fluorescence of cadmium tungstate activated with bismuth alone, and with the relatively feeble fluorescence of cadmium tungstate activated with samarium alone.

2. A phosphor comprising a matrix of cadmium-beryllium tungstate activated with bismuth and samarium as cooperating activators, and characterized by relative whiteness as compared with the usual tint of the phosphor in the absence of the beryllium, and by fluorescence of reddish yellow quality and of serviceable intensity under excitation by 3650 Å. radiation, as contrasted with the yellowish green fluorescence of cadmium tungstate activated with bismuth alone, and with the relatively feeble fluorescence of cadmium tungstate activated with samarium alone.

3. A phosphor comprising cadmium tungstate as matrix material, activated with bismuth and samarium as cooperating activators, the proportion of samarium being more than double that of the bismuth, and of the order of $\frac{1}{2}$ to $1\frac{1}{2}$ per cent, said phosphor being characterized by fluorescence of reddish yellow quality and of serviceable intensity under excitation by 3650 Å. radiation, as contrasted with the yellowish green fluorescence of cadmium tungstate activated with bismuth alone, and with the relatively feeble fluorescence of cadmium tungstate activated with samarium alone.

HARRY M. FERNBERGER.